Patented Dec. 23, 1947

2,433,292

UNITED STATES PATENT OFFICE 2,433,292

COLORED FIBROUS GLASS AND METHOD OF MAKING SAME

Jack W. Perloff, Louisville, Ky., assignor to Owens-Corning Fiberglas Corporation, a corporation of Delaware No Drawing. Application April 28, 1943, Serial No. 484,931

6 Claims. (Cl. 117—126)

This invention relates generally to fibrous products and refers more particularly to an improved method of producing colored fibrous products formed of glass or like materials.

In many uses of glass fibers and fibrous glass products it is desirable to have the fibers colored. For instance, where glass fibers are used for electrical insulation on wire and cables it is desirable oftentimes to employ glass fibers of different colors so that the insulated conductors will carry some means of identification whereby the electrical circuits may be traced. Also, colored glass fibers are desirable where yarns or fabrics made from the fibers are used for decorative purposes.

Attempts to produce colored glass fibers commercially have met with several obstacles. The attenuation of fibers from colored glass has not been fully successful in providing all colors because the inclusion of some of the required coloring agents in the glass batch so alters the properties of the glass that high speed commercial production of fibrous glass from the glass has been difficult. The kinds of coloring agents that might be employed with success are therefore limited as far as attenuation of the colored glass is concerned and consequently relatively few colors can at present be obtained by this means.

Dyeing of the finished fibers has heretofore not been successful because of the impermanence of the colors on fibers treated in this way, which impermanence shows up as crocking or bleeding. Apparently this has been due in large measure to the fact that the very smooth surfaces of the non-hygroscopic glass fibers do not permit permanently secure attachment of dye or pigments to the surfaces of the fibers, and, of course, there can be no actual coloring of the glass of the fibers by the dyeing procedures now known in the art. Most coloring of glass fibers by means of dyes has been open to the serious objections that the colors readily bleed and are removed by water and other common solvents even in cases where the dyes themselves were insoluble. An apparent explanation for this lies in the fact that glass displays a high affinity for water so that most materials applied to glass surfaces are readily displaced by water.

Further, coloring and dyeing substances that are highly insoluble in water most usually require application in special solvents which are costly and may also be poisonous or otherwise hazardous, for instance, by being inflammable. This complicates application of such coloring materials and also the production of the fibers where the materials are to be applied during the fiber forming operation.

One of the principal objects of this invention is to impart any one of a variety of colors to fibers formed of glass in such a manner that the color remains fast and stable over a long period of time and under widely varying conditions.

Another object of this invention is to provide a simple, inexpensive method of coloring fibers of the above type which, in addition, enables a wide variety of dyes to be used.

It is a further object of the invention to provide glass fibers coated with film-forming material that may be readily and easily dyed with the common dyes and that may be applied in an aqueous solution or dispersion and then insolubilized to water and most organic solvents. This provides permanently colored glass fibers.

The foregoing, as well as other objects, will be made more apparent from the following detailed description of one specific embodiment of the invention. For the purpose of this description, it will be assumed that it is desired to dye a fabric of interwoven fine glass fibers. However, the invention should not be limited to this specific illustration because it may be advantageously used to dye fibers, strands and yarns of glass fibers with equal advantage.

In accordance with this invention, the fibrous glass product is preferably first cleaned to remove any binder and/or lubricant that may have been applied to the fibers during fabrication of the latter. This cleansing may be done either by washing in suitable detergents or by use of solvents. After the product is thoroughly cleaned, it is immersed in a solution or dispersion of a film-forming substance that will form an adherent film or surface coating on the glass fibers and one that is insoluble to most solvents.

The present invention provides glass fibers coated with a dyed material that forms a smooth continuous film on the fiber surfaces so that uniform coloring is achieved. The material contains no large particles, crystals or aggregates when dried and insolubilized. This is important because in the case of very fine glass fibers, large particles in the film-forming material might in certain cases be as large as or larger than the diameter of the fibers and thus make it difficult to obtain a uniform coating.

The material of the present invention forms a solution or dispersion in water having a low viscosity so that the material can penetrate into the minute spaces between fibers in glass fiber yarns and cloth. At the same time the solutions or dispersions contain sufficient solid material so that upon drying substantial films are formed on the fiber surfaces to take the dye.

I have discovered that glass fibers may be effectively colored by dyeing films on the fiber surfaces, the films being of an inorganic material of the nature of naturally occurring crystalline inorganic, hydrous oxides such as hydrous aluminum and magnesium silicates. Especially useful is the material known as hectorite, which is essentially a magnesium silicate containing a large proportion of calcite, the calcite being ordinarily present in proportions of about 30%. It is a naturally occurring material found at the present time principally in the State of California.

The hectorite is suspended in water and the coarser particles, that is, the particles in excess of colloidal size, are either centrifuged out or allowed to settle out and the resulting suspension is then adjusted to contain about 2 to 5% or more of solids. This suspension may be employed without further concentration if desired.

The strands, yarns or cloths of glass fibers are impregnated with the suspension of hectorite by being dipped in the suspension, and the impregnated fibrous product is then dried in any suitable manner and preferably by heating to a temperature in the neighborhood of 110° C. The hectorite suspension dries readily and deposits a uniform continuous film on the fiber surfaces.

After the impregnated mat, yarn or cloth is dried, it is immersed or otherwise wetted with a selected coloring agent or dye. Any one of the ordinary organic or inorganic dyes may be used to obtain the desired color. For example, I have obtained a range of colors by employing methyl red, methylene blue, methylene blue plus methyl red, blue ink, methyl orange, potassium dichromate and alizarene yellow. Other dyes may, of course, be used.

The product is again dried and subsequently treated with a material or agent that will fix or insolubilize the dyed hectorite film. Satisfactory results are obtained by employing a strong and preferably concentrated solution of lead acetate and immersing the dyed fibrous product in the solution for a short period of time, say a few minutes or so. In place of lead acetate, solutions of other metallic salts such as zinc, nickel and copper nitrates, magnesium, uranium and copper acetate and various metal chlorides may be employed.

The dyed and treated product is then finally dried and thereafter washed in water to remove any excess dye, lead acetate or other fixing agent.

The above simple and inexpensive process results in a fibrous product wherein the individual fibers are colored to the desired shade and wherein the color remains stable or fast over a long period under widely varying conditions. As proof of stability in color, glass fiber yarns dyed in accordance with the foregoing have been refluxed for a number of hours in water and also immersed in solvents such as 190 proof alcohol without undue fading or bleeding of the color.

I claim:

1. The method of coloring a glass fibrous product comprising immersing the product in a solution containing hectorite, drying the product, immersing the product in a coloring dye, again drying the product and fixing the hectorite in the product by treating the latter with a solution of a metallic salt selected from the group consisting of the acetates of lead, magnesium, uranium and copper, and the nitrates of zinc, nickel and copper.

2. The method of coloring a glass fibrous product comprising immersing the product in a solution containing one to two per cent hectorite, drying the product, subsequently immersing the product in a coloring dye, again drying the product and thereafter immersing the product in a solution of lead acetate.

3. A product of manufacture comprising a textile fabric of glass fibers, and a colored film on the surfaces of the fibers throughout said fabric and containing hectorite insolubilized with lead acetate, and a dye.

4. As an article of manufacture, a fabricated body of a multiplicity of glass fibers, the surfaces of the individual fibers of the body having thereon films of colloidal inorganic material, and a coloring agent incorporated in the colloidal material films to impart color to the individual fibers and to the body.

5. A colored textile yarn composed of a multiplicity of glass fibers, the surfaces of the individual fibers of the yarn having thereon films of colloidal clay, and a coloring agent incorporated in the colloidal clay films to impart color to the individual fibers and to the yarn.

6. A colored textile fabric comprising a plurality of interwoven yarns composed of a multiplicity of glass fibers, the surfaces of the individual fibers of the yarns having thereon colored films, said films containing hectorite and a coloring agent to impart color to the individual fibers and to the yarns and fabric.

JACK W. PERLOFF.

REFERENCES CITED

The following references are of record in the file of this patent:

UNITED STATES PATENTS

| Number | Name | Date |
|---|---|---|
| 2,138,882 | Robie | Dec. 6, 1938 |
| 2,145,235 | Cryor | Jan. 31, 1939 |
| 2,184,316 | Plummer | Dec. 26, 1939 |
| 2,245,783 | Hyde | June 17, 1941 |
| 2,309,962 | Kraus | Feb. 2, 1943 |